United States Patent
Itabashi et al.

(12)

(10) Patent No.: US 6,376,837 B1
(45) Date of Patent: Apr. 23, 2002

(54) OPTICAL SCANNING APPARATUS AND IMAGE FORMING APPARATUS HAVING DEFECTIVE LIGHT SOURCE DETECTION

(75) Inventors: Akihisa Itabashi, Mitaka; Magane Aoki, Yokosuka; Akira Kojima, Chiba; Hiroyuki Suhara, Yokohama; Nobuaki Kubo, Tokyo; Tomoya Ohsugi, Warabi, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/500,731

(22) Filed: Feb. 9, 2000

(30) Foreign Application Priority Data

Feb. 18, 1999 (JP) ............................................. 11-040608
Mar. 16, 1999 (JP) ............................................. 11-069467

(51) Int. Cl.[7] ................................................. H01J 3/14
(52) U.S. Cl. ......................... 250/234; 250/205; 347/236
(58) Field of Search ................................. 250/234, 235, 250/205, 208.1; 359/204, 212, 213; 347/233–236

(56) References Cited

U.S. PATENT DOCUMENTS 5,883,731 A * 3/1999 Kasai ........................... 359/204

* cited by examiner

*Primary Examiner*—Que T. Le
(74) *Attorney, Agent, or Firm*—Greenberg Traurig, LLP (57) ABSTRACT

An optical scanning apparatus is constructed to detect one or more defective or damaged light emitting devices of a light source unit and forms images having substantially the same quality as that of the images formed when all of a plurality of light emitting devices of a light source of the apparatus are functioning normally even when any one of the plurality of light emitting devices are damaged or broken, without decreasing the image forming performance of the apparatus. The optical scanning apparatus detects one or more damaged or broken light emitting devices and then compensates for the light omitted due to the damaged or broken light emitting devices using the normally functioning light emitting devices without decreasing the image forming speed or quality of the optical scanning apparatus. In order to compensate for a defective light emitting device, the optical scanning apparatus uses various solutions such as increasing the rotating speed of the deflector while increasing the modulation speed of the light emitting devices by the same amount, increasing beam spot diameter in the subscanning direction, changing the output power of the light emitting devices on a surface to be scanned in order to increase beam spot diameter in the main scanning direction and the subscanning direction, and changing the focal length of the line image forming optical apparatus and increasing either the rotation speed of the deflector or the rotation speed of the surface to be scanned or photoconductive drum.

23 Claims, 10 Drawing Sheets

OPTICAL SPOT SCANNING DIRECTION

OPTICAL SCANNING APPARATUS AND IMAGE FORMING APPARATUS HAVING DEFECTIVE LIGHT SOURCE DETECTION

BACKGROUND OF THE INVENTION

1. Field of the Invention

The present invention relates to image forming apparatuses, such as a laser printer, a laser copying machine and other apparatuses capable of forming images, and an optical scanning apparatus used in such image forming apparatuses.

2. Discussion of Related art

An optical scanning apparatus used in image forming apparatuses such as a laser printer and a laser copying machine scans a surface of a photoconductor, which functions as a surface to be scanned, using light emitted from a light source to optically form information and images on the surface to be scanned.

An optical scanning apparatus described in Japanese Laid-open Patent Publication No. 9-211944 includes more than two laser diodes as light emitting devices of a light source. When any one of the laser diodes are broken and if at least one of the laser diodes is functioning normally, the apparatus optically forms information on a photoconductor, which defines a surface to be scanned, by using the laser diodes functioning normally while reducing the rotation speed of the photoconductor in accordance with the number of the laser diodes which are functioning normally.

Japanese Laid-open Patent Publication No. 10-151798 describes another optical scanning apparatus, in which a photoconductor is optically scanned with beams emitted by a plurality of light emitting devices. When a light detector detecting the light emitting conditions of the light emitting devices detects that any one of the light emitting devices is not operating properly and is no longer emitting light such that the optical image forming performance of the light emitting devices has been decreased, the apparatus optically forms information and images using the light emitting devices which are functioning normally while adjusting the relative moving speed of the photoconductor and the scanning beams according to the number of light emitting devices which are defective and are no longer emitting light. More specifically, the apparatus reduces the moving speed of the photoconductor according to the number of light emitting devices which are defective and are no longer emitting light.

As described above, in conventional devices, when any of a plurality of light emitting devices of a light source are broken, in order to form an image having substantially the same quality as that of the images formed when the plurality of light emitting devices are functioning normally, a method to reduce a moving speed of a surface to be scanned is used. However, this method has a problem in that the moving speed of the scanned medium is significantly decreased and thereby, the image forming performance of the apparatus is greatly decreased.

SUMMARY OF THE INVENTION

In order to overcome the above-described and other problems, preferred embodiments of the present invention provide a novel optical scanning apparatus that forms images having substantially the same quality as the quality of the images formed when all of a plurality of light emitting devices of a light source of the optical scanning apparatus are functioning normally even when any one of the plurality of light emitting devices are damaged or broken, without decreasing the image forming performance of the apparatus, by detecting one or more damaged or broken light emitting devices and then compensating for the light omitted due to the damaged or broken light emitting devices using the normally functioning light emitting devices without decreasing the image forming speed of the optical scanning apparatus.

According to a preferred embodiment of the present invention, a novel apparatus and method of detecting a defective or broken light emitting device in an optical scanning apparatus includes arranging a light receiving element along an optical path including a synchronous detecting sensor, an imaging element and a mirror. The light receiving element can be located between the synchronous detecting sensor and the imaging element, or between the imaging element and the mirror. The light receiving element preferably has an opening having a shape which produces different light intensity at different points along the synchronous detecting sensor so that the synchronous detecting sensor can detect the difference between actual light passing through the light receiving element in the form of the light sensed at the synchronous detecting sensor and the expected light intensity distribution when all light emitting devices are operating normally. A defective light emitting device is detected by determining differences between actual and expected values for light intensity and light volume. Once a defective light emitting device is detected, a controller identifies which light emitting device is defective and makes a correction that is appropriate to correct for the defective light emitting device.

Other preferred embodiments of the present invention provide various novel apparatuses and methods for compensating for light omitted due to the damaged or broken light emitting devices using the normally functioning light emitting devices without decreasing the image formation speed of the image forming apparatus. Such novel apparatuses and methods use various solutions such as increasing the rotating speed of the deflector while increasing the modulation speed of the light emitting devices by the same amount, increasing beam spot diameter in the subscanning direction, changing the output power of the light emitting devices on a surface to be scanned in order to increase beam spot diameter in the main scanning direction and the subscanning direction, and changing the focal length of the line image forming optical apparatus and increasing either the rotation speed of the deflector or the rotation speed of the surface to be scanned or photoconductive drum.

According to one such preferred embodiment of the present invention, a novel apparatus and method for optical scanning is such that images are formed to have excellent quality even if one or more of light emitting devices of a light source are damaged or broken, without affecting or decreasing the image forming performance of the apparatus, by compensating for light omitted due to the damaged or broken light emitting devices using the normally functioning light emitting devices and by controlling the deflecting speed of a deflector and the moving speed of a scanned medium.

The preferred embodiments of the present invention further provide a novel optical scanning apparatus that forms images having no white spots caused by omitted light resulting from damaged or broken light emitting devices even when any one of a plurality of light emitting devices of the apparatus are damaged or broken, without deteriorating the image forming performance of the apparatus, by changing the diameter of a beam spot, or the diameter of a dot forming an image, which is formed on a surface of the medium scanned by the beam spot.

According to another preferred embodiment of the present invention, an optical scanning apparatus for scanning a surface with light to optically form information and images on the surface, includes a light source unit having a plurality of light sources which are arranged in a sub-scanning direction such that beam spots are formed at a desired interval on the scanned surface. A coupling lens couples divergent light flux from the light source to a subsequent optical system and a deflector having a deflecting surface deflects incident light flux. A first image forming lens system having a power in a sub-scanning direction forms a line image near a deflecting surface of the deflector and a second image forming lens system forms the light flux deflected by the deflector into an optical beam spot on the scanned surface.

According to preferred embodiments of the present invention, in the above-described optical scanning apparatus, when any one of the plurality of light sources of the light source unit are damaged or broken and if at least one of the plurality of light sources is emitting light normally, a controller controls the apparatus to optically form information on the scanned surface using the light sources that are not damaged and that are emitting light normally.

According to another preferred embodiment of the present invention, in the above-described optical scanning apparatus, when any one of the plurality of light sources of the light source unit are damaged or broken and if at least one of the plurality of light sources is emitting light normally, the apparatus selects light sources from the light sources which are not damaged and are still emitting light normally according to the number of the light sources emitting light normally and the position of the normally emitting light sources in the light source unit and optically forms information on the scanned surface with the selected light sources.

According to various preferred embodiments of the present invention, the apparatus may further include a mechanism to change the position of the first image forming lens system.

According to other preferred embodiments of the present invention, further, the apparatus may change a quantity of light on the scanned surface so as to change a size of a beam spot on the scanned surface when forming information and images on the scanned surface.

Further, according to other preferred embodiments of the present invention, the diameter of a beam spot scanning the scanned surface may be made larger than a size relative to a resolution of dots formed by the beam spot on the scanned surface.

According to another preferred embodiment of the present invention, in the above optical scanning apparatus, when any one of the plurality of light sources are damaged or broken and if at least one of the plurality of light sources is emitting light normally, a deflecting speed of the deflector is changed according to the number of light sources that are not damaged and are still emitting light normally and according to the position of the normally emitting light sources in the light source unit.

According to still another preferred embodiment of the present invention, in the above optical scanning apparatus, the apparatus further preferably includes a plurality of openings or apertures and a switching device to switch the plurality of openings or apertures which are constructed to change the diameter of the opening among a plurality of diameters, and, when any one of the plurality of light sources are damaged or broken and if at least one of the plurality of light sources is emitting light normally, one of the plurality of openings is arbitrarily selected or one of the plurality of diameters of the openings is selected according to the number of light sources that are not damaged and are still emitting light normally and the arrangement of the normally emitting light sources in the light source unit so as to regulate light flux from the light source with the selected one of the plurality of openings or the opening having the selected diameter.

According to still another preferred embodiment of the present invention, the above-described optical scanning apparatus includes a plurality of first image forming lens systems having a power in a sub-scanning direction and forming a line image near a deflecting surface of a deflector, and when any one of the plurality of light sources are damaged or broken and if at least one of the plurality of light sources is emitting light normally, one of the plurality of first image forming lens systems is selected according to the number of the light sources that are not defective and are still emitting light normally and the position of the normally emitting light sources in the light source.

According to preferred embodiments of the present invention, the deflecting speed of the deflector or the moving speed of the scanned surface may be changed according to the selected first image forming lens system.

A method of detecting a light emitting device of a light source unit, which is not functioning normally, from a plurality of the light emitting devices included in the light source unit, using a light receiving element configured such that the distance that each beam from the plurality of light emitting devices passes over the light receiving element in the main scanning direction is different from each other.

A light receiving element for detecting one or more of a plurality of light emitting devices, of a light source unit, that are not functioning normally, is configured such that the distance that each beam emitting from the plurality of the light emitting devices passes over the light receiving element in the main scanning direction is different from each other. The light receiving element is arranged in the main scanning area of a scanning apparatus after a deflector and outside of an effective main scanning area of the scanning apparatus.

Other features, elements, advantages and characteristics of the present invention will become more apparent from the detailed description of preferred embodiments of the present invention in conjunction with the attached drawings.

BRIEF DESCRIPTION OF THE DRAWINGS

A more complete appreciation of the present invention and many of the attendant advantages thereof will be readily obtained as the same becomes better understood by reference to the following detailed description of preferred embodiments thereof when considered in conjunction with accompanying drawings, wherein:

FIG. 2 is a diagram illustrating various light emitting states of a light source having four light emitting devices arranged in the sub-scanning direction, including a sub-diagram (1) illustrating a state in which all of the four light emitting devices are normally emitting light, a sub-diagram (2) illustrating a state in which the fourth light emitting device is not emitting light normally, a sub-diagram (3) illustrating a state in which the third light emitting device is not emitting light normally, a sub-diagram (4) illustrating a state in which the second light emitting device is not emitting light normally, a sub-diagram (5) illustrating a state in which the first light emitting device is not emitting light normally, a sub-diagram (6) illustrating a state in which the third and fourth light emitting devices are not emitting light normally, a sub-diagram (7) illustrating a state in which the first and fourth light emitting devices are not emitting light normally, a sub-diagram (8) illustrating a state in which the first and second light emitting device are not emitting light normally, a sub-diagram (9) illustrating a state in which the second and fourth light emitting devices are not emitting light normally, a sub-diagram (10) illustrating a state in which the first and third light emitting devices are not emitting light normally, and a sub-diagram (11) illustrating a state in which the second and third light emitting devices are not emitting light normally;

FIGS. 3(A–E) are diagrams schematically illustrating various states of optical scanning on a surface of a scanned medium when some of a plurality of light emitting devices of a light source are damaged or broken, including a sub-diagram (a) illustrating a state in which all of the four light emitting devices are emitting light normally, a sub-diagram (b) illustrating a state in which the fourth light emitting device is not emitting light normally and a scanning operation is performed normally (i.e., without changing the deflecting speed and without changing the beam spot diameter), a sub-diagram (c) illustrating a state in which the fourth light emitting device is not emitting light normally and when the scanning operation is performed with the deflecting speed increased by 4/3 times, a sub-diagram (d) illustrating a state in which the second and fourth light emitting devices are not emitting light normally and the scanning operation is performed normally, a sub-diagram (e) illustrating a state in which the second and fourth light emitting devices are not emitting light normally and the scanning operation is performed with the beam spot diameter enlarged in the sub-scanning direction;

DETAILED DESCRIPTION OF PREFERRED EMBODIMENTS

Figure 1:
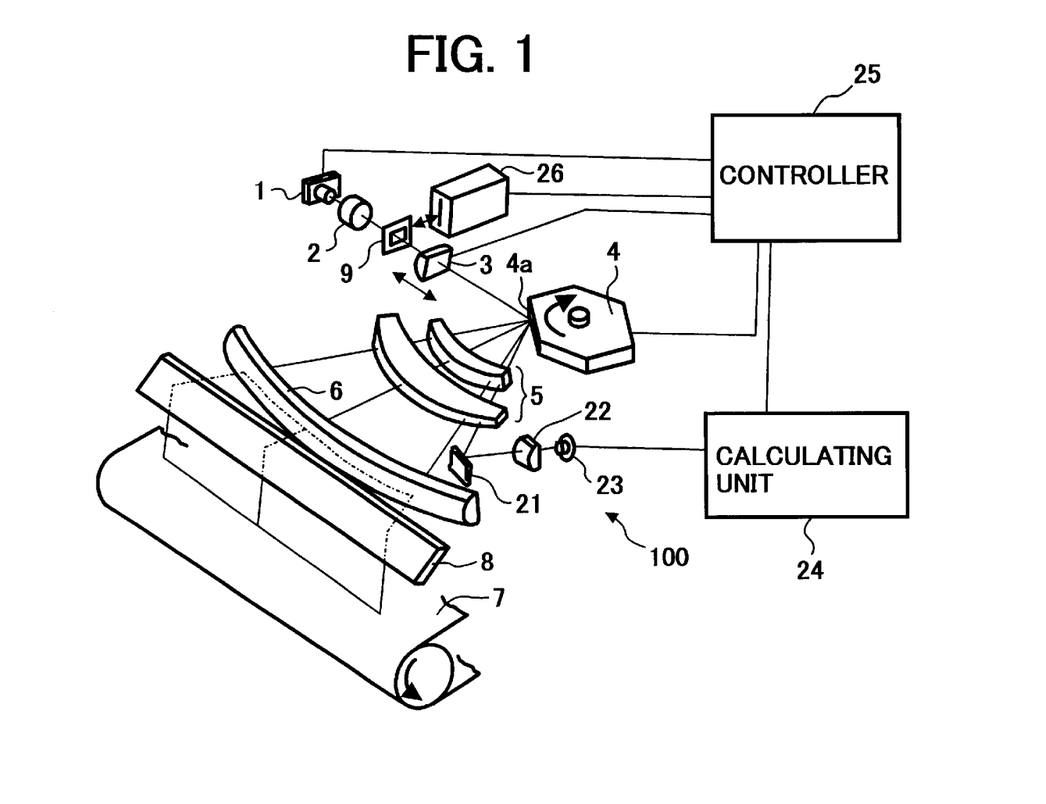
FIG. 1 is a schematic drawing illustrating an exemplary structure of a scanning optical system of an optical scanning apparatus.

FIG. 1 is a schematic drawing illustrating an exemplary structure of a scanning optical system of an optical scanning apparatus. A light source unit 1 having a plurality of light emitting devices irradiates a divergent light flux. The light flux from the light source unit 1 passes a condensing lens 2 and then the diameter of the light flux is regulated by an opening or aperture 9 that regulates a light flux. The light flux is then imaged near a deflecting reflective surface 4a of a deflector 4 in a line formed by a line image forming optical system 3 and the deflector 4 deflects the incident light flux at equiangular velocity. A f(θ) lens 5 and a lens 6 are arranged between the deflector 4 and a scanned medium 7 so that the deflected light flux forms a focused beam spot on the surface of the scanned medium 7. The focused beam spot scans the surface of the scanned medium 7 as a result of rotation of the deflector 4. A synchronous detector system 100 includes a synchronous detecting sensor 23, an imaging element 22 to guide a light flux to the synchronous detecting sensor 23 and a mirror 21, and synchronizes start timings of optical writing. The synchronous detector system 100 may also include a calculating unit 24 and a controller 25, which operate as described below.

As a light source unit, instead of the above-described light source unit 1 having a plurality of light emitting devices, a light source unit which synthesizes a plurality of light fluxes from a plurality of light sources by a prism or other similar element may be used.

Figure 2:
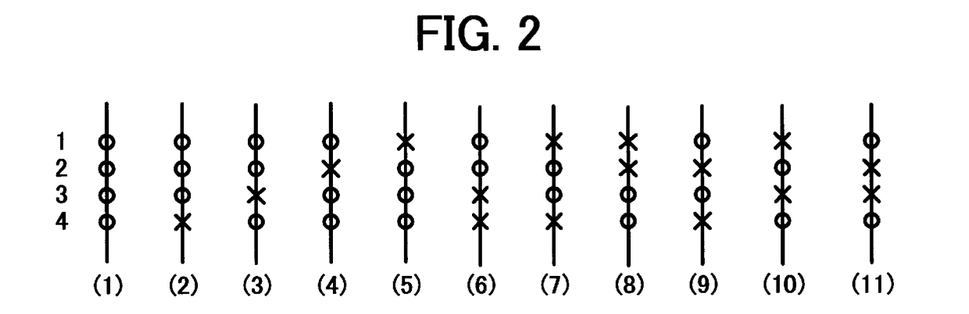

FIG. 2 schematically illustrates various light emitting states of the light source unit 1 when the light source unit 1 has four light emitting devices arranged in a row in a sub-scanning direction. In FIG. 2, a circle indicates that a corresponding light emitting device is emitting light normally and an "x" indicates that a corresponding light emitting device is not emitting light normally. Although the number of light emitting devices is preferably four as shown in FIG. 2, the number of light emitting devices may be any number, for example, two or 10.

A sub-diagram (1) of FIG. 2 illustrates a state in which all of the four light emitting devices are emitting light normally, sub-diagrams (2) through (5) illustrate states in which one of the four light emitting devices is broken, and sub-diagrams (6) through (11) illustrate states in which two of the four light emitting devices are broken.

When the above-described optical scanning apparatus is operated when one of the four light emitting devices of the light source unit is broken as illustrated in one of the sub-diagrams (2) through (5) of FIG. 2, a resulting image will be formed with a corresponding one of the four scanning lines omitted.

FIG. 3 illustrates various states of optical spots on a surface of the scanned medium 7. When all of the four light emitting devices are emitting light normally, all of four scanning lines corresponding to the four light emitting devices scan the scanned medium 7 as illustrated in a sub-diagram (a) of FIG. 3. When one of the four light emitting devices, for example, the fourth light emitting device, is broken as illustrated in the sub-diagram (2) of FIG. 2, an image is formed such that the scanning line corresponding to the fourth light emitting device is omitted, as illustrated in a sub-diagram (b) of FIG. 3.

Figure 3A:
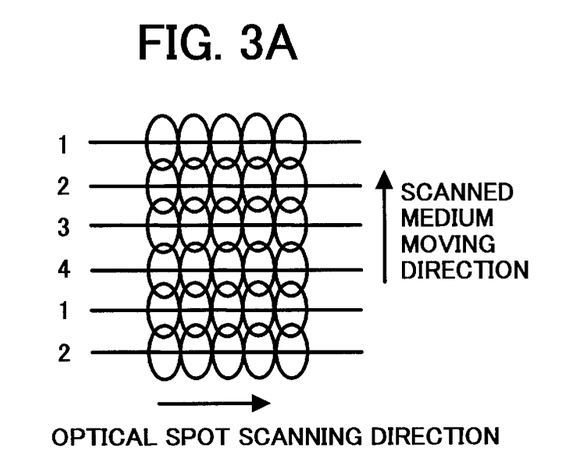
Figure 3B:
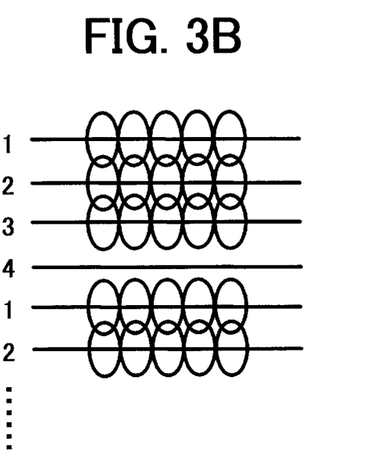
Figure 3C:
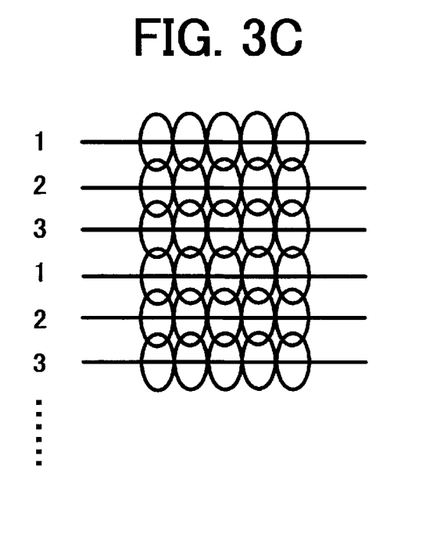
Figure 3D:
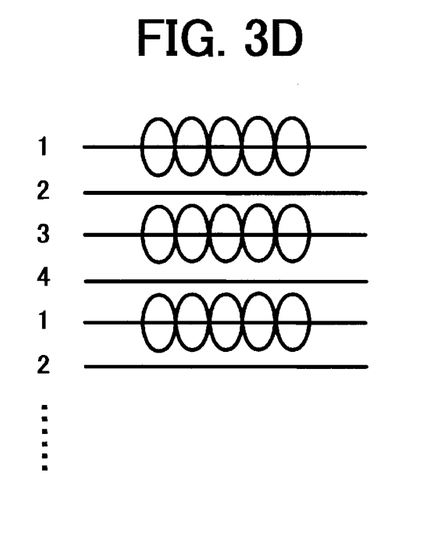
Figure 3E:
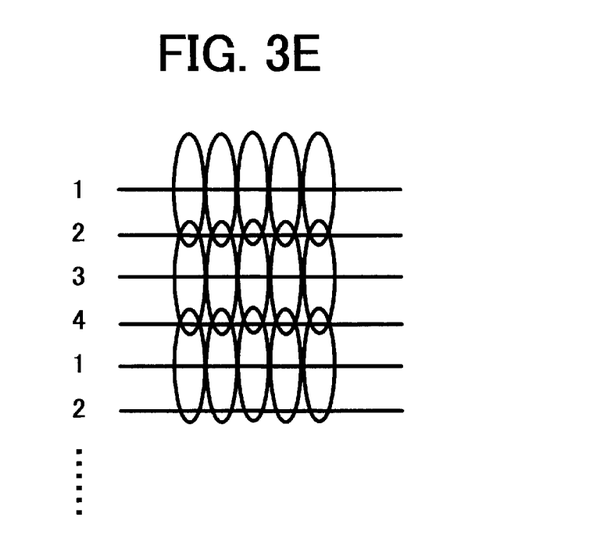

In such a case, according to one preferred embodiment of the present invention, the deflecting speed of the deflector 4 is increased by about 4/3 times normal speed and the modulation speed of the light emitting devices is increased by about 4/3 times a normal speed. As a result, an image having substantially the same quality as that formed when all of the four light emitting devices are emitting light normally is formed, as illustrated in a sub-diagram (c) of FIG. 3. In this case, because the moving speed of the scanned medium 7 is not changed, the image forming speed of an image forming apparatus using the above optical scanning apparatus is not changed and thus, the image forming performance including image formation quality and image forming speed of the image forming apparatus is not decreased.

Similarly, when the third light emitting device or the second emitting device is broken as illustrated in the sub-diagram (3) or (4) of FIG. 2, an image having substantially the same quality as that formed when all of the four light emitting devices are emitting light normally can be formed by shutting off the fourth light emitting device when the third light emitting device is broken and the first light emitting device when the second light emitting device is broken, respectively, and increasing the deflecting speed of the deflector 4 and the modulation speed of the light emitting devices emitting light normally by a factor of two.

When the deflecting speed of the deflector 4 cannot be increased, an image having substantially the same quality as that formed when all of the four light emitting devices are emitting light normally can be formed by increasing the diameter of a beam spot in the sub-scanning direction. For example, if the fourth light emitting device is broken as illustrated in the sub-diagram (2) of FIG. 2, an image can be formed normally by shutting off the second light emitting device so that every other one of the light emitting devices emit light and increasing the beam spot diameter in the sub-scanning direction so that the enlarged beam spots cover the area to be covered by the beam spots corresponding to the broken or shut off light emitting devices, as illustrated in a sub-diagram (e) of FIG. 3.

Similarly, when the third light emitting device is broken as illustrated in the sub-diagram (3) of FIG. 2, when the second light emitting device is broken as illustrated in the sub-diagram (4) of FIG. 2 or when the first light emitting device is broken as illustrated in the sub-diagram (5) of FIG. 2, an image can be formed normally by shutting off the first, fourth, or third light emitting device, and increasing the beam spot diameter in the sub-scanning direction.

The beam spot diameter can be increased in the sub-scanning direction by either changing the diameter of the opening 9, changing a focal length of the line image forming optical system 3 or changing the position of the line image forming optical system 3.

More specifically, the beam spot diameter in the subscanning direction can be increased to compensate for the omitted light from one or more defective or damaged light emitting devices. If one light emitting device is defective, an adjacent light emitting device that is functioning normally is turned off, and then the two remaining beams are made to have a double diameter to cover missing beam spots omitted because of the damaged light emitting device and the adjacent light emitting device that was turned off. In an alternative method, if one light emitting device is defective, the two adjacent light emitting devices can be controlled such that the two surrounding beam spots can be increased to have double diameter to cover the missing beam spot, thereby overlapping to cover the missing beam spot.

There are many ways to increase the beam spot diameter in subscanning direction including: (1) changing the diameter of the opening 9 using a known process including one in which various size apertures are contained a multiple aperture device and the aperture is changed by positioning the desired-size aperture into position along the optical path, or using blocking elements to change the size of aperture which can be achieved by the controller 25 moving the elements of the opening changing unit 26; (2) changing the focal length of line forming imaging optical system 3 by changing the lens itself or adding another lens element, which can be done by the controller 25 controlling some mechanical lens changer inside of the system 3 and moving a desired lens element into position along the optical path; (3) changing the position of the line image forming optical system 3, which can be achieved by the controller controlling a mechanical lens changer inside of the system 3 and moving a desired lens element into position along the optical path.

Figure 4A:
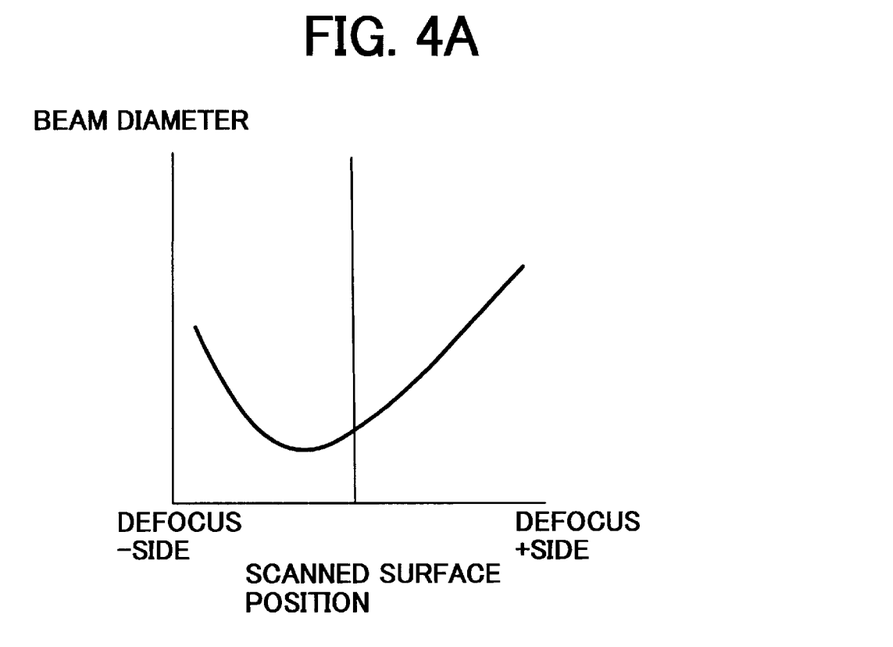
FIG. 4(a) is a diagram illustrating a change of the beam spot diameter according to a position relative to the surface of the scanned medium.
Figure 4B:
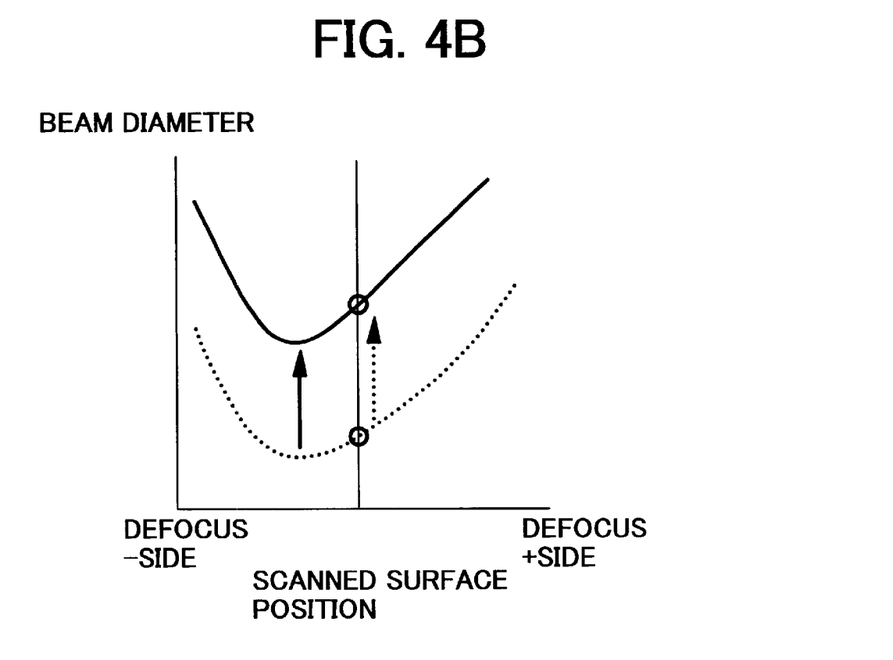
FIG. 4(b) is a diagram illustrating a change of the beam spot diameter when the diameter of an aperture is reduced.
Figure 4C:
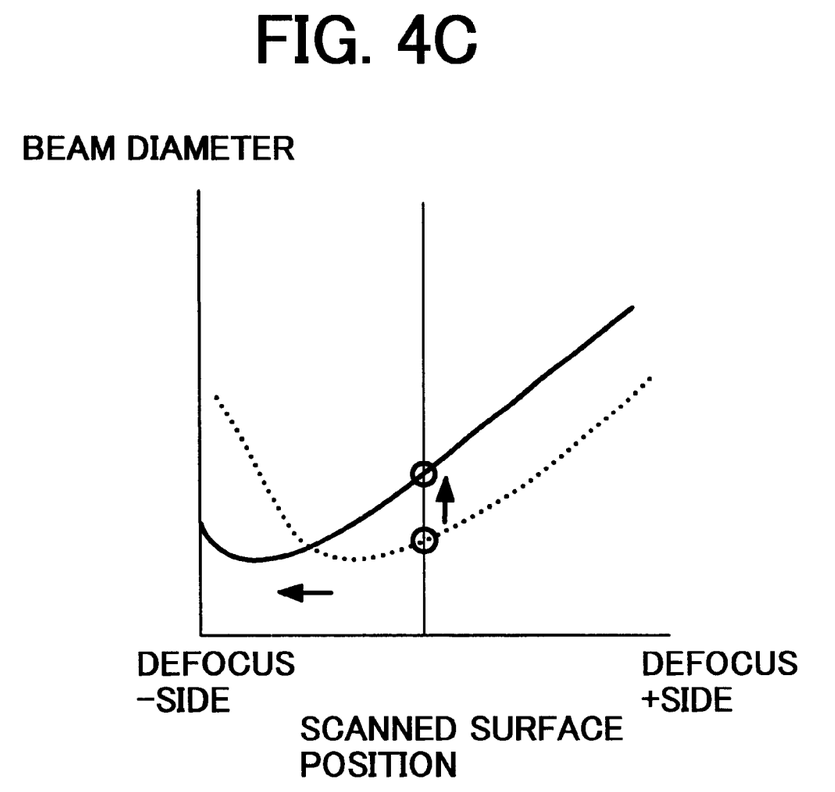
FIG. 4(c) is a diagram illustrating a change of the beam spot diameter when only a focal length of a line image forming optical system is changed and the diameter of the aperture and the arrangement of the line image forming optical system are not changed.

FIGS. 4(a)–4(c) are diagrams illustrating that the beam spot diameter changes according to the position relative to the surface of the scanned medium 4. The position at the side of the deflector 4 relative to the surface of the scanned medium 7 is indicated as the minus (−) side and the position at the rear side of the scanned medium 7 is indicated as the plus (+) side in FIGS. 4(a) and 4(b).

When the diameter of the opening 9 is reduced, as illustrated in FIG. 4(b), the position of the beam waist relative to the surface of the scanned medium 7 is not changed and the diameter of the beam spot increases irrespective of the position relative to the scanned medium 7. In FIG. 4(b), the dotted line indicates the position of a beam spot before the diameter of the opening 9 is changed and the solid line indicates the position of the beam spot after the diameter of the opening 9 is changed. This relationship between the diameter of an opening and the beam spot diameter is well known as a formula 1: $W1 = -K \times \beta \times \lambda \times f1 / (I1 \times W2)$, by which an arbitrary beam spot diameter $W1$ is obtained by changing the diameter of an opening $W2$. In formula 1, $W1$ represents the radius of a beam spot diameter, $W2$ represents the radius of an opening or aperture, $\beta$ represents the lateral magnification of a scanning optical system in the sub-scanning direction, $K$ is a constant, $\lambda$ represents a wavelength and $f1$ represents the focal length of a line image forming optical system.

Figure 5A:
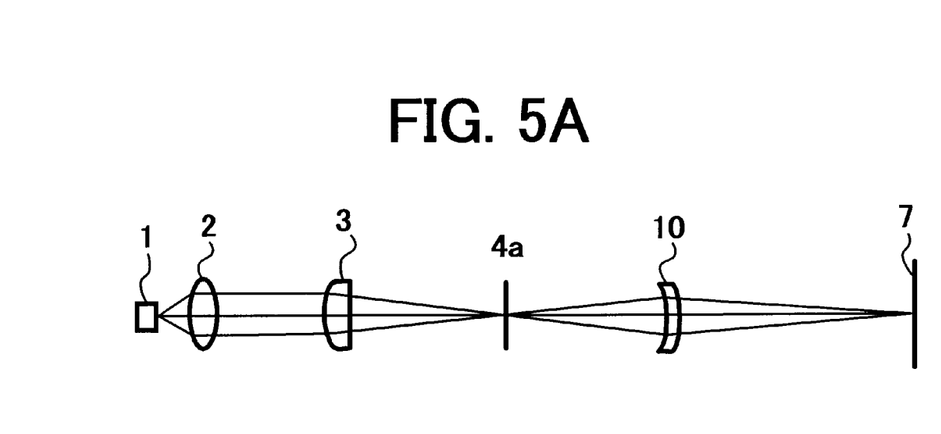
FIGS. 5(a) and 5(b) are drawings schematically illustrating that an image forming position changes according to a focal length of a line image forming lens system of a scanning optical system, FIG. 5(a) illustrating the scanning optical system in a normal state and FIG. 5(b) illustrating a state in which the image forming position deviates according to the focal length of the line image forming optical system.
Figure 5B:
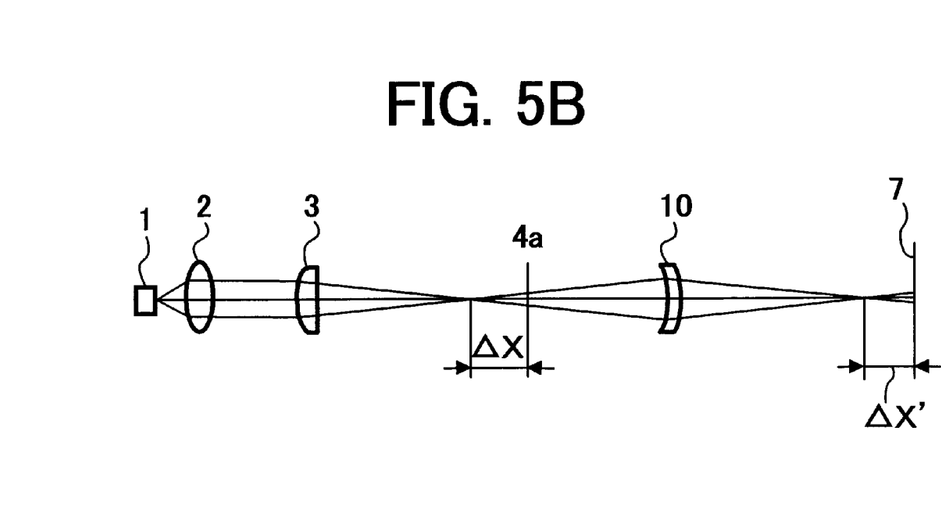

When the focal length of the line image forming optical system 3 is changed and the diameter of the opening or aperture 9 and the position of the line image forming optical system 3 are not changed, the position of the beam waist relative to the scanned medium 7 is changed in a direction indicated by an arrow shown in FIG. 4(c) and thereby the beam spot diameter is increased. This relation is known as a formula 2: $\Delta X' = -\beta \times \Delta X^2$, expressing that when the focal length of a line image forming optical system is changed, the position of a line image is changed by $\Delta X$ and thereby the position of a beam waist is changed by $\Delta X'$. In formula 2, $\Delta X'$ indicates the amount of deviation of a beam waist position, $\Delta X$ indicates the amount of deviation of the position of a line image and $\beta$ indicates the lateral magnification of an optical scanning lens system. FIGS. 5(a) and 5(b) are drawings schematically illustrating the scanning optical system of FIG. 1 in the sub-scanning direction, in which a synthesized system of the fθ lens 5 and the lens 6 is expressed as an optical scanning lens system 10.

When the position of the line image forming optical system 3 is changed, according to formula 2 above, the position of the line image is changed by $\Delta X$ and thereby the position of the beam waist is changed by $\Delta X'$, and thereby the diameter of the beam spot is similarly increased.

Figure 6:
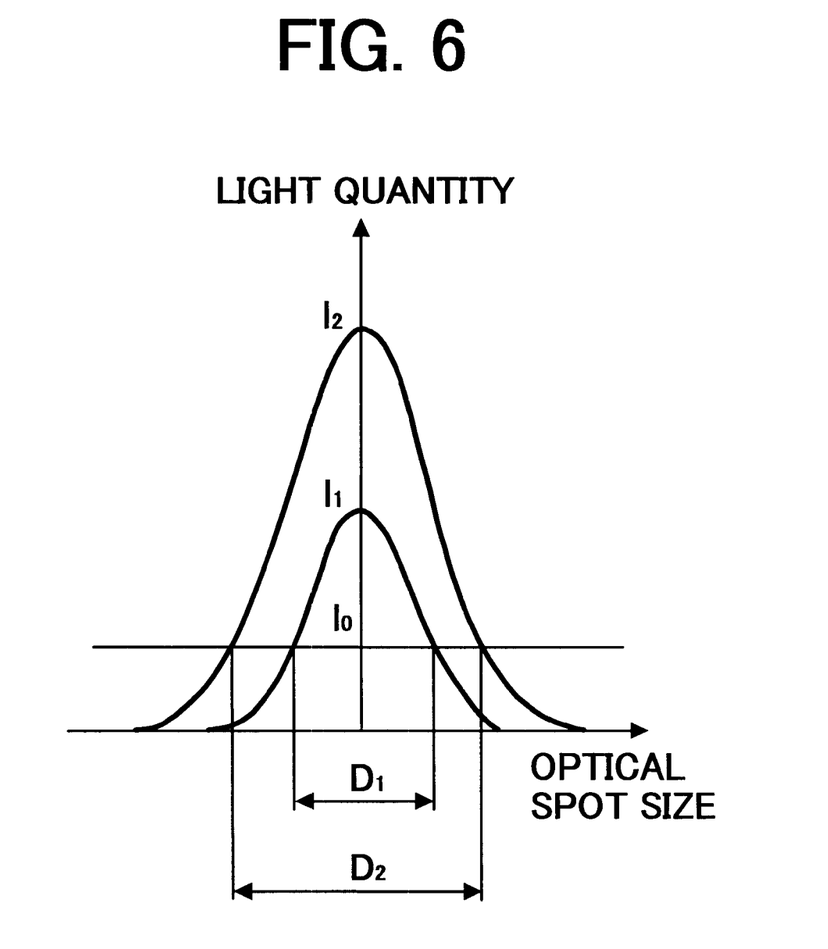
FIG. 6 is a diagram for explaining a method of changing the diameter of a dot forming an image on a surface of the scanned medium by changing the quantity of light on the surface of the scanned medium.

The same effect as that achieved by increasing the beam spot diameter in the sub-scanning direction can be achieved by changing the output power of the light emitting devices on the surface of the scanned medium 7 so as to change the diameter of a dot forming an image on the surface of the scanned medium 7. In FIG. 6, assume that an image can be formed on the surface of the scanned medium 7 when the quantity of light is above I0. Assuming that the quantity of light when the light source 1 is operating normally, i.e., emitting light normally, is I1, the dot diameter on the surface of the scanned medium 7 is D1. If the quantity of light when the light source 1 is operating normally, is increased to I2, the dot diameter on the surface of the scanned medium 7 becomes D2 and thereby the diameter of the dot is increased. Thus, the dot on the surface of the scanned medium 7 has a shape similar to the one illustrated in a sub-diagram (e) of FIG. 3 and thereby, the area to be scanned by the omitted light emitting devices are covered.

In the above method, i.e., increasing the beam spot diameter or the dot diameter so as to cover the area to be covered by the beam spots corresponding to the broken or shut off light emitting devices, although the resolution of dots in the sub-scanning direction is reduced, the moving speed of the scanned medium 4 is not reduced and therefore, the image formation quality and speed of image formation of an image forming apparatus using this novel method is not decreased.

Next, a method for maintaining the image quality of an original image by changing the focal length of a line image forming optical system and the rotation speed of a deflector 4 is described. This method can be applied when every other light emitting devices emits light, such as when the second and fourth light emitting devices, or the first and third light emitting devices are broken as illustrated in the sub-diagrams (9) or (10) of FIG. 2. Further, the method can be applied when one of the four light emitting devices are broken as illustrated in the sub-diagrams (2)–(5) of FIG. 2 and another light emitting device is shut off so that every other light emitting device emits light.

Figure 7:
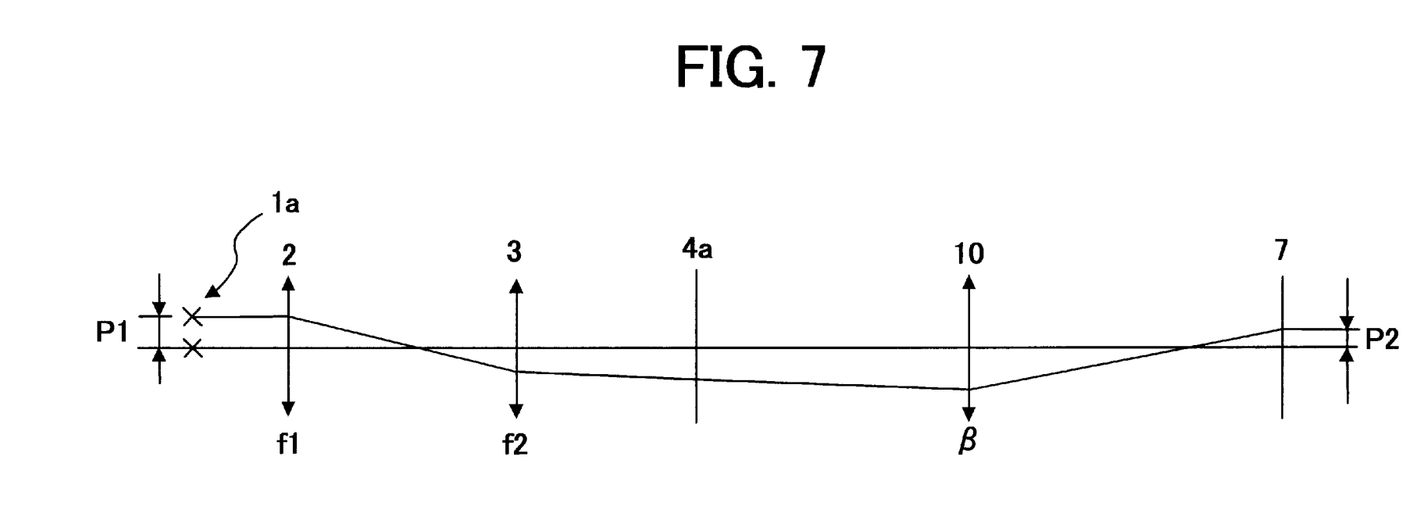
FIG. 7 is a diagram for explaining a relationship between a distance between the light emitting devices of the light source and a scanning pitch on the surface of the scanned medium in the sub-scanning direction.

FIG. 7 is a diagram for explaining a relationship between a distance between the light emitting devices 1a of the light source unit 1 and a scanning pitch on the surface of the scanned medium 7 in the sub-scanning direction. In FIG. 7, Pi represents the distance between the light emitting devices indicated by "x" characters and P2 represents the scanning pitch on the surface of the scanned medium 7. The relationship is expressed by a formula 3: $P2 = -\beta \times f2/f1 \times P1$, in which $\beta$ represents the lateral magnification of a scanning optical system 10 in the sub-scanning direction, f1 represents the focal length of a condensing lens 2, and f2 represents the focal length of a line image forming optical system 3.

When every other light emitting device emits light, by reducing the focal length f2 to half (f2/2), the beam pitch on the surface of the scanned medium 7 is reduced by half and therefore, the scanning pitch P2 remains substantially the same as when all of the four light emitting devices emit light. However, if the moving speed of the scanned medium 7 is not changed, the beam pitch on the surface of the scanned medium 7 becomes as illustrated in the sub-diagrams (6)–(8) of FIG. 2. In this case, therefore, an image having substantially the same quality as an image formed when all of the light emitting devices are emitting light normally can be formed by doubling either the moving speed of the scanned medium 7 or the deflecting speed of the deflector 4. The modulation speed of the light emitting devices is preferably doubled when the deflecting speed of the deflector 4 is doubled.

Now, a preferred embodiment of the present invention in which a defective light emitting device is detected will be described. In FIG. 1, the synchronous detecting sensor 23 may be constructed to also function as a light receiving element for detecting a light emitting device which is not functioning normally, and a calculating unit 24 is connected to the synchronous detect sensor 23 functioning as the light receiving element.

Figure 10:
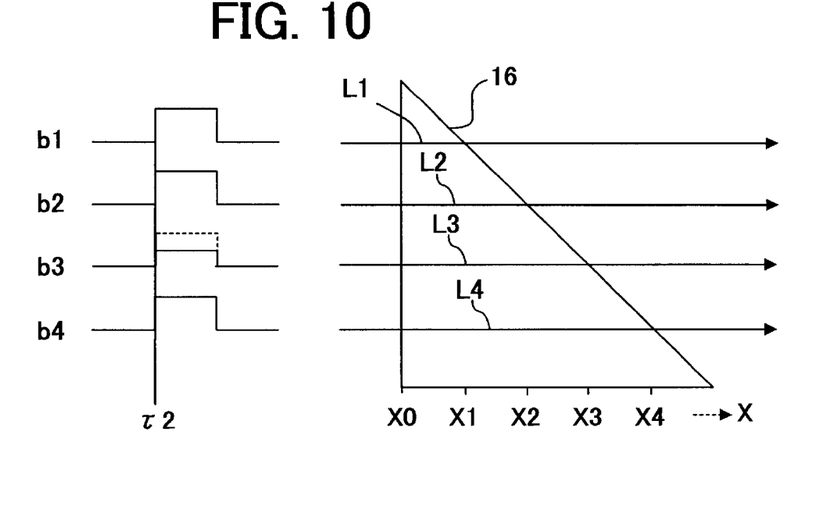
FIG. 10 is a diagram illustrating a state in which the third beam of the four beams has only one half of the pulse height (i.e., the third light emitting device is not functioning normally).

In this example, the synchronous detecting sensor 23 includes a substantially triangular-shaped light receiving element 16 illustrated in the right portion of FIG. 10, and the substantially triangular-shaped light receiving element 16 is arranged such that one of the sides thereof is substantially perpendicular to the main scanning direction of the scanning apparatus. Because of the substantially triangular shape of the light receiving element 16, the distance that each light beam passes (scans) over the light receiving element 16 in the main scanning direction is different from each other.

Figure 8:
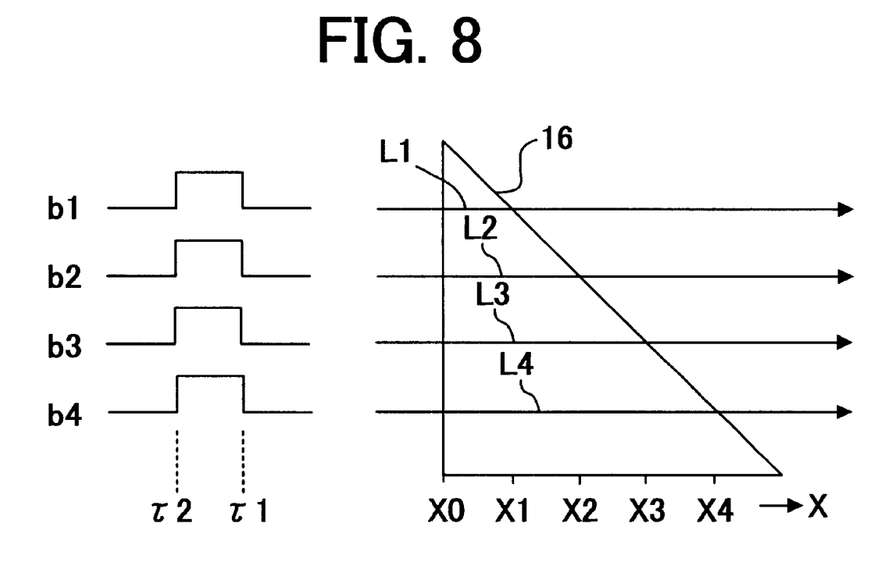
FIG. 8 is a diagram illustrating a state in which four beams, emitted from four light emitting devices and having the same pulse height (i.e., functioning normally) respectively, pass a light receiving element having a substantially triangular shape so as to make the distance that each beam passes over the light receiving element in the main scanning direction different from each other.

As illustrated in the left portion of FIG. 8, four beams b1–b4 from the four light emitting devices of the light source unit 1 are aligned in the sub-scanning direction, and when all of the four light emitting devices are functioning normally, all of the four beams b1×b4 have substantially the same pulse height and pulse width.

When each of the beams b1–b4 passes through light detecting paths L1–L4 of the light receiving element 16, the integrated light intensity of each beam is detected by the light receiving element 16. As a result, a light intensity pattern as illustrated in FIG. 9, for example, is detected by the light receiving element 16.

Specifically, the light receiving element 16 starts detecting each beam which has been made high immediately before reaching the edge X0 of the light receiving element 16 when the first pulse edge τ1 of each beam reaches the edge X0. The intensity of light received by the light receiving element 16 gradually increases as time progresses, and reaches the maximum intensity when the second pulse edge τ2 passes the edge X0 at a corresponding timing T0 of FIG. 9.

Figure 9:
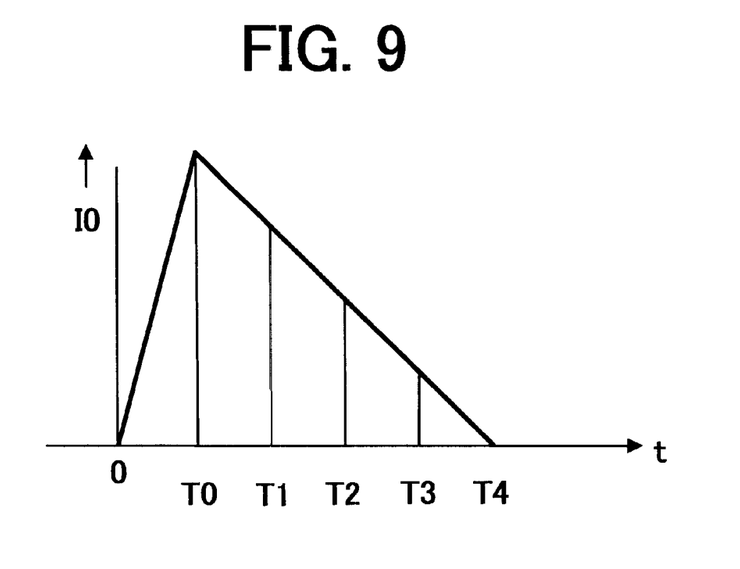
FIG. 9 is a diagram illustrating a light intensity pattern of light received by the light receiving element when all of the four light emitting devices are functioning normally.

When the second pulse edge τ2 of the first beam b1 reaches a point X1 of the light receiving element 16 at a corresponding time T1 of FIG. 9, the light receiving element 16 is receiving the second through fourth beams b2–b4

(except the first beam b1), and when the second pulse edge τ2 of the second beam b2 reaches a point X2 at a corresponding time T2, the light receiving element 16 is receiving the third and fourth beams b3 and b4 (except the beams b1 and b2). Similarly, when the second pulse edge τ2 of the third beam b3 reaches a point X3 at a corresponding time T3, the light receiving element 16 is receiving only the fourth beam b4, and when the second pulse edge τ2 reaches a point X4 at a corresponding timing T4, the light receiving element 16 stops detecting the beams.

The volume F0 of the light received by the light receiving element 16 is calculated based upon the detected light intensity value I0 with the following formula:

$$F0 = I0(t)dt \quad (4)$$

Data of the light intensity of the light source unit 1 when all of the light emitting devices are functioning normally, are stored in a memory, i.e., the light intensity pattern data and the light volume F0 obtained with the above formula.

For detecting if any one of the plurality of light emitting devices of the light source unit 1 is not functioning normally, the light receiving element 16 detects the light intensity I1 and the light volume F1 of the detected light is calculated by the calculating unit 24 with the following formula:

$$F1 = I1(t)dt \quad (5)$$

Then, the difference between F0 and F1 is calculated by the calculating unit 24 with the following formula:

$$F2 = F0 - F1 \quad (6)$$

When all of the light emitting devices are functioning normally, F1=F0 and therefore F2 is zero.

Figure 11:
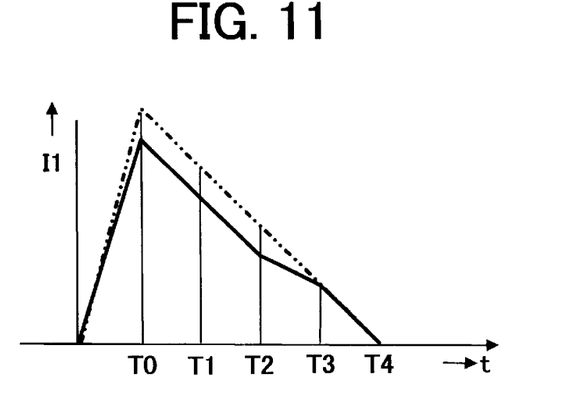
FIG. 11 is a diagram illustrating a light intensity pattern of light received by the light receiving element when the third light emitting device is not functioning normally and the corresponding third beam has one half of the pulse height.

When the third light emitting device of the light source unit 1 is not functioning normally and only one half of the light intensity is being output by the third light emitting device, for example, as illustrated in the left portion of FIG. 10, the light intensity pattern of the light received by the light receiving element 16 is as indicated by a solid line of FIG. 11, which is different from that of the light when all of the light emitting devices are functioning normally, which is indicated by a dotted line. In this case, F≠F0.

Figure 12:
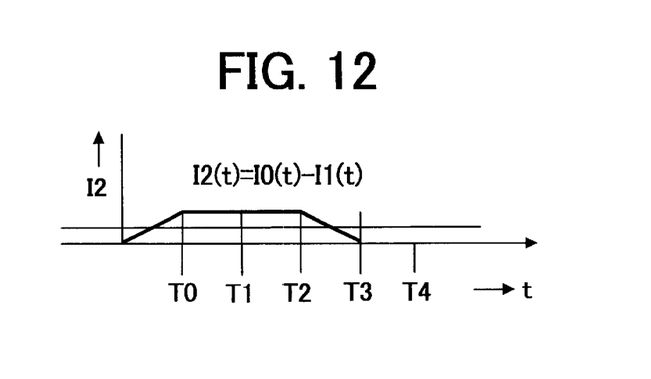
FIG. 12 is a diagram illustrating a pattern of the light intensity difference between the light received by the light receiving element when all of the four light emitting devices are functioning normally and that received when the third light emitting device is not functioning normally.

When it is determined that F1≠F0, the light intensity pattern of the light received by the light receiving element 16 is compared with the light intensity pattern data stored in the memory by the calculating unit 24, and the light intensity difference pattern of I2(t)=I0(t)−I1(t) is obtained as illustrated in FIG. 12.

Because the light intensity difference goes below a predetermined threshold level Ls between the time T2 and T3 and the detected light intensity pattern after the time T3 matches with the stored light intensity pattern data, it is determined that the third beam b3 does not have a predetermined light intensity and that therefore the third light emitting device is not functioning normally.

Further, the volume of light intensity change can be calculated by dividing the integrated light intensity value with the distance between X3 and X0, i.e., a time between T3 and T0. Generally, the volume of change in the light intensity at the timing Ti (ΔJi) is expressed as follows:

$$\Delta Ji =$$

The above-described method can detect a plurality of light emitting devices of the light source 1, which are not functioning normally at the same time.

Also, the above-described method can be used when the light source unit 1 has more than four light emitting devices.

Further, the above-described method can be used even when the plurality of light emitting devices are arranged diagonally, not in a straight line, in the sub-scanning direction.

Furthermore, the light receiving element 16 may have any shape that causes the distance each light beam passes through the light receiving element 16 to be different from each other.

Also, instead of using the light receiving element 16 having a substantially triangular shape as described above, an aperture having a substantially triangular shape, for example, can be arranged before the synchronous detecting sensor 23 functioning as a light receiving element for detecting a light emitting device that is not functioning normally, such that the distance each light beam passes through the aperture is different from each other and thereby the distance each beam scans over the synchronous detect sensor 23 in the main scanning direction is different from each other. The aperture can be any shape that causes the distance each beam passes through the aperture to be different from each other.

Numerous additional modifications and variations of the present inventions are possible in light of the above teachings. It is therefore to be understood that within the scope of the appended claims, the present invention may be practiced otherwise than as specifically described herein.

This document claims priority and contains subject matter related to Japanese Patent Application No. 11-040608 filed in the Japanese Patent Office on Feb. 18, 1999, the entire contents of which are hereby incorporated by reference.

What is claimed is:

1. A method of optical scanning comprising the steps of:
   modulating a plurality of light source elements to produce a plurality of light beams;
   detecting a defective condition of at least one of the plurality of light source elements; and
   correcting for the defective condition of the at least one of the plurality of light source elements without changing an image formation speed.

2. The method according to claim 1, wherein the step of correcting for the defective condition is done without changing a rotation speed of a surface to be scanned.

3. The method according to claim 1, wherein the step of correcting includes increasing a rotation speed of a deflector and increasing a modulation speed of the plurality of light source elements.

4. The method according to claim 1, wherein the step of correcting includes increasing a beam spot diameter of a plurality of beam spots incident upon a surface to be scanned in a sub scanning direction.

5. The method according to claim 4, wherein the beam spot diameter of the plurality of beam spots is increased in the subscanning direction by one of changing a diameter of an aperture unit, changing a focal length of a line forming imaging optical system and changing a position of a line forming imaging optical system.

6. The method according to claim 1, wherein the step of correcting includes changing output power of the plurality of light source elements to increase beam spot diameter of a plurality of beam spots incident upon a surface to be scanned in a sub scanning direction.

7. The method according to claim 1, wherein the step of correcting includes changing a focal length of a line image forming optical system and increasing one of a rotation speed of a deflector and a rotation speed of a surface to be scanned.

8. An optical scanning apparatus comprising:
a light source unit including a plurality of light source elements generating a plurality of light beams;
a light aperture unit receiving said plurality of light beams and regulating the light flux of the plurality of light beams;
a line image forming optical system for forming a line image from the plurality of light beams transmitted through the aperture unit;
a deflector arranged to deflect the line image generated by the line image forming optical system and to transmit the deflected line image to a surface to be scanned;
a sensor arranged to sense a defective operation of at least one of the light source elements;
a correcting unit connected to the sensor and arranged to receive an indication from the sensor of a defective condition of said at least one of the plurality of light source elements, the correcting unit arranged to correct the defective condition of said at least one of the plurality of light source elements without changing an image formation speed of the apparatus.

9. The apparatus according to claim 8, wherein the correcting unit corrects the defective condition of said at least one of the plurality of light source elements without changing a rotation speed of the surface to be scanned.

10. The apparatus according to claim 8, wherein the correcting unit includes a controller which is operatively connected to the sensor and to at least one of the light source unit, the aperture unit, the line image forming optical system, and the deflector.

11. The apparatus according to claim 8, wherein the correcting unit corrects the defective operation of said at least one of the plurality of light source elements by increasing a rotation speed of the deflector and increasing a modulation speed of the light source elements.

12. The apparatus according to claim 8, wherein the correcting unit corrects the defective operation of said at least one of the plurality of light source elements by increasing a beam spot diameter of a plurality of beam spots incident upon the surface to be scanned in a subscanning direction.

13. The apparatus according to claim 8, wherein the correcting unit increases the beam spot diameter of the plurality of beam spots by changing a diameter of the aperture unit, changing a focal length of the line forming imaging optical system and changing a position of the line forming imaging optical system.

14. The apparatus according to claim 8, wherein the correcting unit corrects the defective operation of said at least one of the light source elements by changing output power of the light source elements to increase a beam spot diameter of a plurality of beam spots incident upon the surface to be scanned in a subscanning direction.

15. The apparatus according to claim 8, wherein the correcting unit corrects the defective operation of said at least one of the light source elements by changing a focal length of the line image forming optical system and increasing one of a rotation speed of the deflector and a rotation speed of the surface to be scanned.

16. An image forming apparatus comprising:
a light source unit including a plurality of light source elements generating a plurality of light beams;
a light aperture unit receiving said plurality of light beams and regulating the light flux of the plurality of light beams;
a line image forming optical system for forming a line image from the plurality of light beams transmitted through the aperture unit;
a deflector arranged to deflect the line image generated by the line image forming optical system and to transmit the deflected line image to a surface to be scanned;
a sensor for sensing a defective operation of at least one of the light source elements; and
a correcting unit connected to the sensor and receiving an indication from the sensor of a defective condition of said at least one of the light source elements, the correcting unit arranged to correct the defective condition of said at least one of the light source elements without changing an image formation speed of the apparatus.

17. A method of optical scanning comprising the steps of:
modulating a plurality of light source elements to produce a plurality of light beams;
passing the plurality of light beams through a light receiving element;
detecting at least one of a light intensity and a light volume of the plurality of light beams passed through the light receiving element; and
comparing the detected light intensity or the detected light volume to a reference light intensity or reference light volume, respectively, to determine whether one or more of the light source elements is defective.

18. The method according to claim 17, wherein the step of detecting includes detecting both the light intensity and the light volume of the plurality of light beams passed through the light receiving element, and the step of comparing includes comparing both the detected light intensity and the detected light volume to the reference light intensity and the reference light volume, respectively, to determine whether one or more of the light source elements is defective.

19. The method according to claim 17, further comprising the step of correcting for the defective condition of the at least one of the plurality of light source elements without changing an image formation speed.

20. An optical scanning apparatus comprising:
a light source unit including a plurality of light source elements generating a plurality of light beams;
a light aperture unit receiving said plurality of light beams and regulating the light flux of the plurality of light beams;
a line image forming optical system for forming a line image from the plurality of light beams transmitted through the aperture unit;
a deflector arranged to deflect the line image generated by the line image forming optical system and to transmit the deflected line image to a surface to be scanned;
a sensor unit including a light receiving element arranged to receive the deflected line image to detect at least one of a light intensity and a light volume of the deflected line image; and
a calculating unit arranged to receive from the sensor unit data representative of the detected light intensity or the detected light volume and to compare the detected light intensity or the detected light volume to a reference light intensity or reference light volume, respectively, to determine whether one or more of the light source elements is defective.

21. The apparatus according to claim 20, wherein the sensor unit is arranged to detect both the light intensity and the light volume of the plurality of light beams passed through the light receiving element, and the calculating unit is arranged to compare both the detected light intensity and the detected light volume to the reference light intensity and the reference light volume, respectively, to determine whether one or more of the light source elements is defective.

22. The apparatus according to claim 20, further comprising a correcting unit connected to the sensor unit and arranged to receive an indication from the sensor unit of a defective condition of said at least one of the light source elements, the correcting unit arranged to correct the defective condition of said at least one of the light source elements without changing an image formation speed of the apparatus.

23. An image forming apparatus comprising:

a light source unit including a plurality of light source elements generating a plurality of light beams;

a light aperture unit receiving said plurality of light beams and regulating the light flux of the plurality of light beams;

a line image forming optical system for forming a line image from the plurality of light beams transmitted through the aperture unit;

a deflector arranged to deflect the line image generated by the line image forming optical system and to transmit the deflected line image to a surface to be scanned;

a sensor unit including a light receiving element arranged to receive the deflected line image to detect at least one of a light intensity and a light volume of the deflected line image; and a calculating unit arranged to receive from the sensor unit data representative of the detected light intensity or the detected light volume and to compare the detected light intensity or the detected light volume to a reference light intensity or reference light volume, respectively, to determine whether one or more of the light source elements is defective.

* * * * *